United States Patent
Chueh et al.

(10) Patent No.: US 8,321,696 B2
(45) Date of Patent: Nov. 27, 2012

(54) METHOD TO SUPPORT SWITCHABLE GRAPHICS WITH ONE VOLTAGE REGULATOR

(75) Inventors: Yung Fa Chueh, Hsichin (TW); Chin-Jui Jiu, Xizhi (TW); So-Yu Weng, Sijhih (TW); Wen-Hung Huang, Taipei (TW)

(73) Assignee: Dell Products L.P., Round Rock, TX (US)

(*) Notice: Subject to any disclaimer, the term of this patent is extended or adjusted under 35 U.S.C. 154(b) by 234 days.

(21) Appl. No.: 12/872,034

(22) Filed: Aug. 31, 2010

(65) Prior Publication Data
US 2012/0054502 A1 Mar. 1, 2012

(51) Int. Cl.
*G06F 1/00* (2006.01)
(52) U.S. Cl. ........................... 713/300; 713/100
(58) Field of Classification Search .......... 713/300–340, 713/100
See application file for complete search history.

(56) References Cited

U.S. PATENT DOCUMENTS 7,366,929 B1 * 4/2008 Mimberg ..................... 713/310
8,054,316 B2 * 11/2011 Azar et al. .................... 345/589
2008/0082623 A1 4/2008 Michael et al.

OTHER PUBLICATIONS

Intersil, PWM DC/DC Controller with VID Inputs for Portable GPU Core-Voltage Regulator, ISL95870, ISL95870A, ISL95870B, Dec. 22, 2009.
Intersil, Multiphase PWM Regulator for IMVP-7 Mobile CPUs, ISL95831, Aug. 28, 2009.

* cited by examiner

*Primary Examiner* — Brian Misiura
*Assistant Examiner* — Kim Huynh
(74) *Attorney, Agent, or Firm* — Hamilton & Terrile, LLP; Stephen A. Terrile

(57) ABSTRACT

A voltage regulator for use with switchable graphics processors. The voltage regulator includes a graphics processor mode selection control input. By providing the graphics processor mode selection control input it is possible to save pins for a parallel voltage identification (PVID) input (e.g., a 2-bit PVID input). The voltage regulator further includes a PVID input to allow the voltage regulator to switch a detection input to either a SVID type input or a PVID type input. The voltage regulator further includes voltage shifter for a PVID detection circuit.

8 Claims, 5 Drawing Sheets

METHOD TO SUPPORT SWITCHABLE GRAPHICS WITH ONE VOLTAGE REGULATOR

BACKGROUND OF THE INVENTION

1. Field of the Invention

The present invention relates to information handling systems and more particularly to supporting switchable graphics via a single voltage regulator.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to provide information handling systems with a hybrid graphics implementation. In a hybrid graphics implementation, an integrated Graphics Processing Unit (iGPU) and the discrete Graphics Processing Unit (dGPU) are operational at different times (i.e., domains) and in different power states (P-states) depending on the state of the information handling system. Known hybrid graphics implementations generally use two independent voltage regulators (VRs) to support the iGPU and the dGPU because their voltage level requirements are often quite different. For example, the voltage level requirements for a known iGPU (such as the Arrandale Dual Core iGPU available from Intel Corporation) is via the voltage identification (VID) pins of the iGPU. Known iGPU systems often require seven bits of the VID signal. Another known iGPU will be controlled via the serial voltage identification (SVID) pins. Additionally, both of these iGPUs can require the use of a two-phase solution so as to provide better thermal performance and reliability.

With known dGPUs the voltage level requirement is often for three different voltage levels. The three voltage levels can be provided via a voltage regulator without the need for VID pins. However, it is often difficult to use the same voltage regulator (i.e., a voltage regulator which includes VID pins) to support both iGPU and dGPU because the VIDs are usually only generated by a iGPU as compared to a dGPU.

FIG. 1, labeled Prior Art, shows one example of a known voltage regulator solution in which two independent voltage regulators are used to support switchable GPUs. In this example, one of the voltage regulators is controlled via the VID pins of the integrated graphics controller whereas the other voltage regulator is controlled via general purpose input/output (GPIO) pins of an embedded controller. FIG. 2, labeled Prior Art, shows another example of a known voltage regulator solution. With this voltage regulator solution, a single voltage regulator is used meet the power requirements for both iGPU and dGPU. However, in this solution, it is not clear how the GPIO control bits are used to fulfill the power requirements of both iGPU and dGPU. With this solution, the 7 VID bits are sent by iGPU directly to the voltage regulator. Accordingly, an embedded controller within the voltage regulator needs to use seven GPIO pins to change their VID value to generate a suitable voltage while the information handling system is operating in a dGPU mode of operation. These seven GPIO bits share the same 7-bit VID truth table of voltage regulator. Such a system also adds signal Mosfets to isolate the signal between an embedded controller (EC) and iGPU on these bits. Also, because voltage level of VID may not be the same as the voltage level of the GPIO, it may be necessary to provide a voltage shifter for each pin. FIG. 3, labeled Prior Art, shows another example of a known voltage regulator solution. In this solution, the voltage regulator uses two pins to select one of voltages in its VID table which is loaded via SVID pins.

Accordingly, it would be desirable to provide a voltage regulator solution to address some or all of these issues. For example, it would be desirable to provide a voltage regulator which prevents the changing of VID values while the information handling system is operating in a dGPU mode of operation. Also, it would be desirable to provide a voltage regulator which generates both two-phase power as well as one-phase power to support switchable graphics technology.

SUMMARY OF THE INVENTION

In accordance with the present invention, a voltage regulator for use with switchable graphics processors is disclosed. The voltage regulator includes a graphics processor mode selection control input. By providing the graphics processor mode selection control input it is possible to save pins for a parallel voltage identification (PVID) input (e.g., a 2-bit PVID input). The voltage regulator further includes a PVID input to allow the voltage regulator to switch a detection input to either a SVID type input or a PVID type input. The voltage regulator further includes voltage shifter for a PVID detection circuit. When operating with a GPIO voltage level of 0.65V~1.3V, the voltage regulator can function without the need for a voltage shifter circuit. Also, the voltage regulator can be easily modified to include a voltage shifter for these 2-bit or 3-bit VIDs if needed. Also, because in certain embodiments, the processor and the iGPU use the same SVID pins, the voltage regulator further includes switches to avoid affecting processor communication on SVID pins while the information handling system is operating in a dGPU mode of operation.

More specifically, in one embodiment, the invention relates to an apparatus for regulating voltage to an integrated graphics controller and a discrete graphics controller. The apparatus includes a single power source; and, a graphics controller detection circuit coupled to the single power source, the graphics controller detection circuit receiving a graphics controller mode selection signal and providing a graphics power output signal based upon a state of the graphics controller mode selection signal.

In another embodiment, the invention relates to an information handling system which includes a single power source; an integrated graphics controller; a discrete graphics controller; and, a system for regulating voltage to the integrated graphics controller and the discrete graphics controller coupled to the single power source, the integrated graphics controller and the discrete graphics controller. The system includes a graphics controller detection circuit coupled to the single power source, the graphics controller detection circuit receiving a graphics controller mode selection signal and providing a graphics power output signal based upon a state of the graphics controller mode selection signal.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
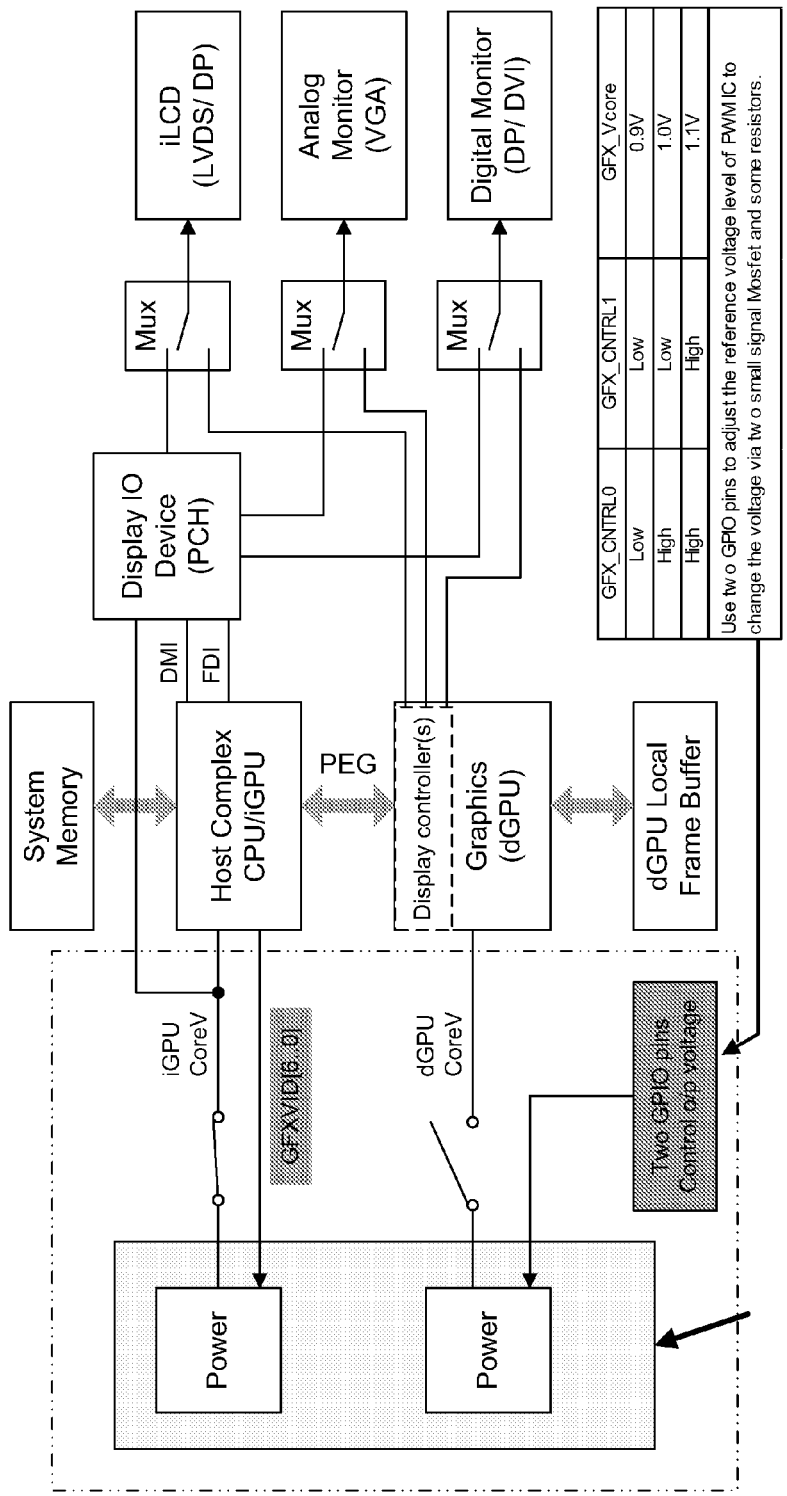
FIG. 1, labeled Prior Art, shows one example of a known voltage regulator solution in which two independent voltage regulators are used to support switchable GPUs.
Figure 2:
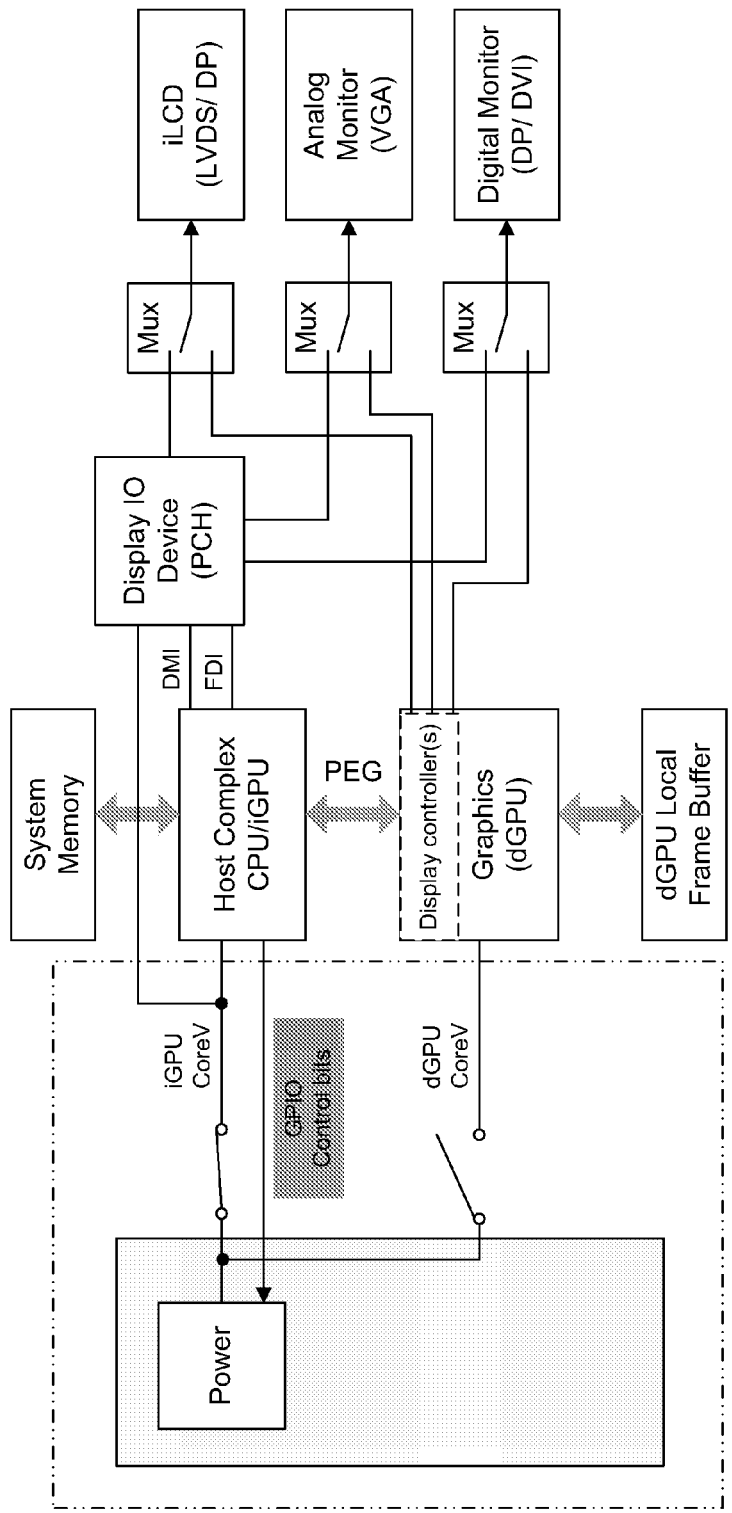
FIG. 2, labeled Prior Art, shows another example of a known voltage regulator solution.
Figure 3:
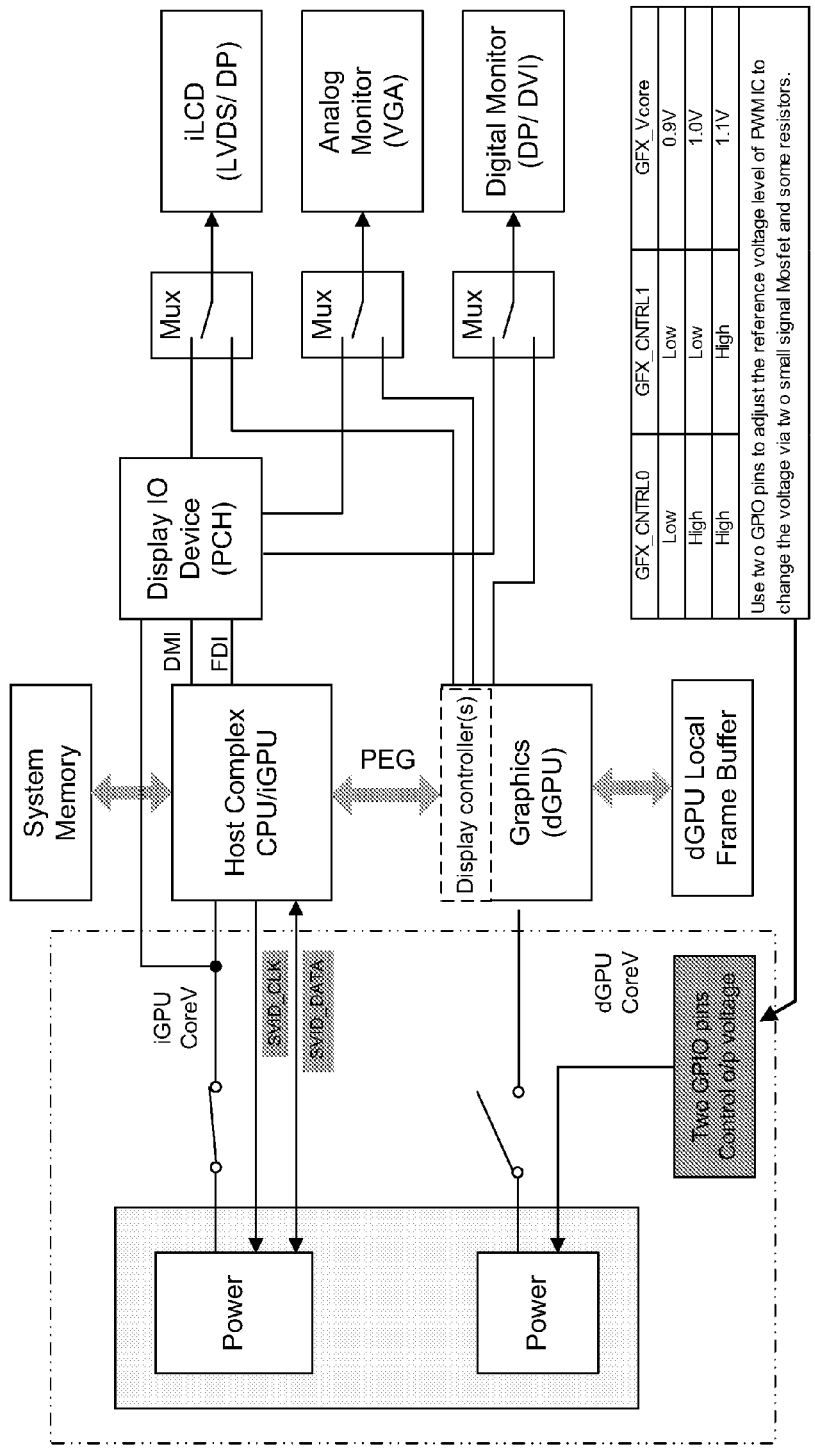
FIG. 3, labeled Prior Art, shows another example of a known voltage regulator solution.
Figure 4:
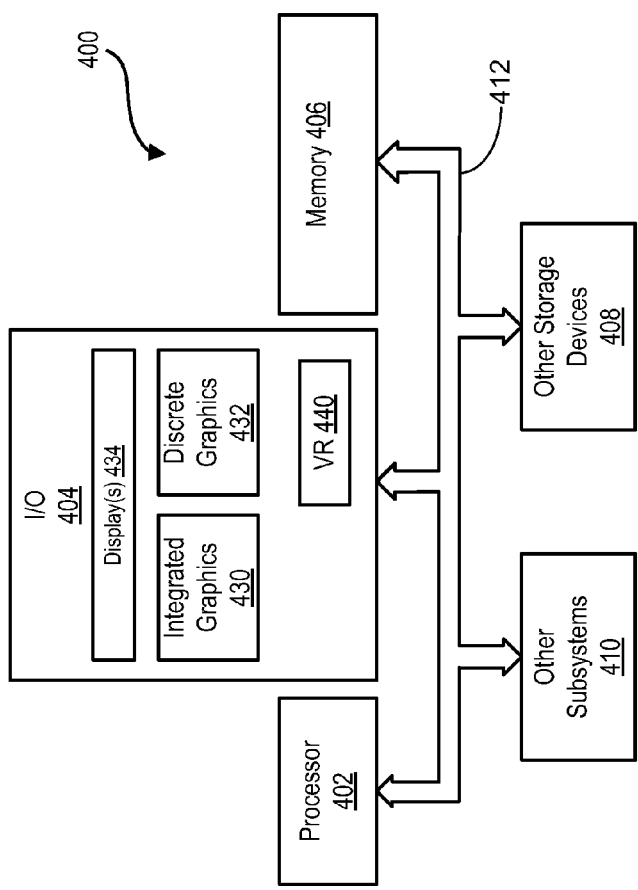
FIG. 4 shows a system block diagram of an information handling system.

Referring briefly to FIG. 4, a system block diagram of an information handling system 400 is shown. The information handling system 400 includes a processor 402, input/output (I/O) devices 404, such as a display, a keyboard, a mouse, and associated controllers (each of which may be coupled remotely to the information handling system 400), a memory 406 including volatile memory such as random access memory (RAM) and non-volatile memory such as a hard disk and drive, and other storage devices 408, such as an optical disk and drive and other memory devices, and various other subsystems 410, all interconnected via one or more buses 412.

In certain embodiments, the I/O devices 404 include an integrated graphics processing unit 430 as well as a discrete graphics processing unit 432 which may be coupled to one or more displays 434. The I/O devices 404 also includes a voltage regulator 440 for providing power to both the integrated graphics processing unit 430 and the discrete graphics processing unit 432.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 5:
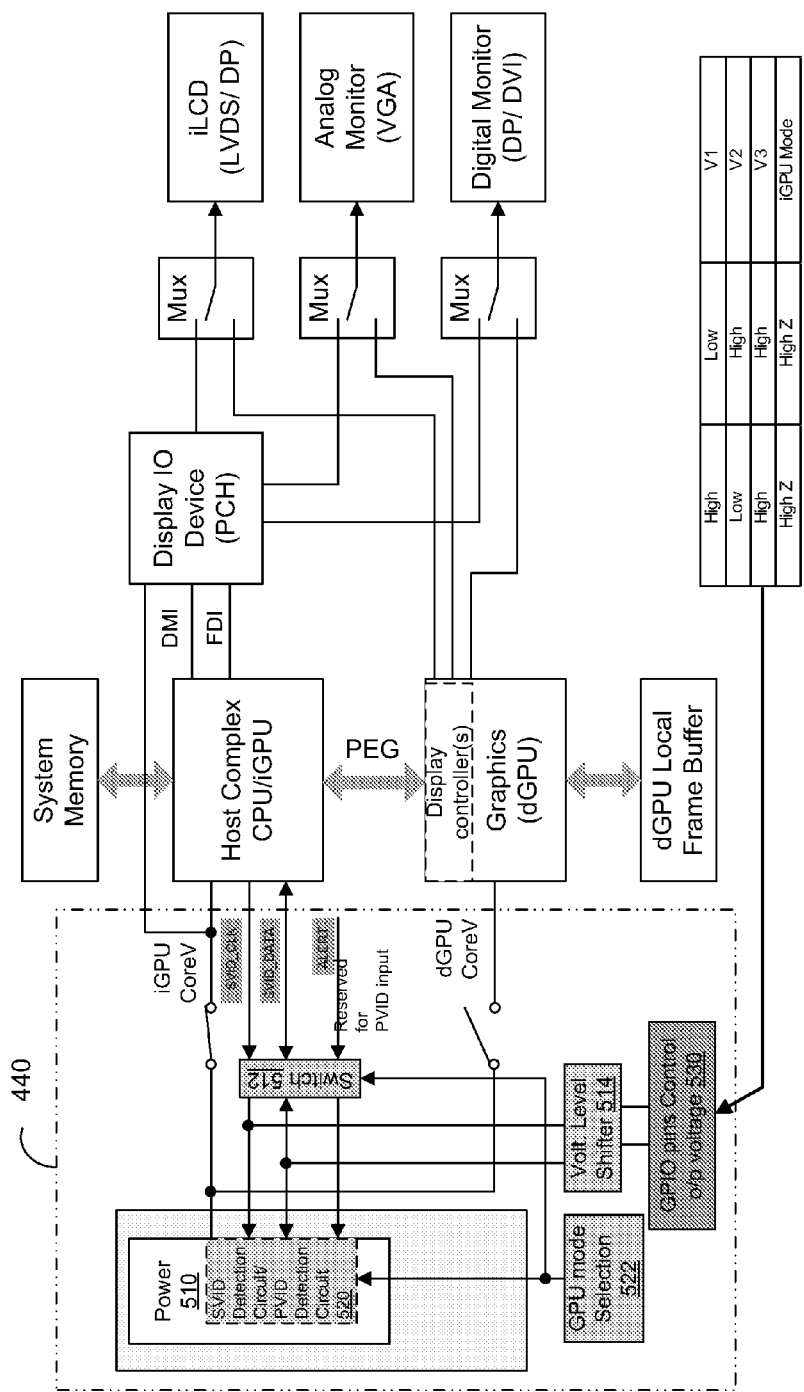
FIG. 5 shows a voltage regulator in accordance with the present invention.

Referring to FIG. 5, a block diagram of a voltage regulator along with switchable graphics processors is shown. More specifically, the voltage regulator 440 includes a power source 510 as well as a graphics adapter selection switch 512 and a voltage level shifter 514. The voltage regulator 440 further includes a graphics controller detection circuit 520 which receives a graphics controller mode selection signal 522 and provides a graphics power output signal based upon a state of the graphics controller mode selection signal. The voltage regulator 440 further includes GPIO input 530 (e.g., two GPIO input pins).

The power source 510 of the voltage regulator 440 receives the graphics processor mode selection control input 522. By providing the graphics processor mode selection control input it is possible to save pins for a PVID input. The voltage regulator further includes a PVID input to allow the voltage regulator to switch a detection input to either a SVID type input or a PVID type input. The voltage regulator further includes voltage shifter for a PVID detection circuit. Also, when operating with a 2-bit GPIO voltage level of 03.3V, the voltage regulator can function without the need for a voltage shifter circuit. Also, the voltage regulator can be easily modified to include a voltage shifter for these 2-bit or 3-bit parallel VIDs if needed. Also, because in certain embodiments, the processor and the iGPU use the same SVID pins, the voltage regulator further includes switches to avoid affecting processor communication on SVID pins while the information handling system is operating in a dGPU mode of operation.

Accordingly, the voltage regulator allows using a single voltage regulator (e.g., with a serial VID) to support switchable graphics technology such as the Huron River platforms available from Intel Corp. Thus, the voltage regulator supports both an iGPU (e.g., via a SVID signal) and a dGPU and saves cost and space. Based on the input of the graphic mode selection pin, the voltage regulator switches to either a SVID input or a 2-bit or 3-bit (plus alert pin) VID input. Then, the voltage regulator supplies a suitable output voltage to either the iGPU or the dGPU based upon different GPU mode.

More specifically, when the system is operating in an iGPU mode of operation, the switch for the dGPU is open. The embedded controller sets the output of the two GPIO pins in high impedance, so this output won't affect the signal of the SVID pins. Also, the voltage level for the iGPU is controlled by the SVID pins (SVID_clk and SVID_data). because the voltage range of SVID is 0.65V~1.3V, the voltage regulator adds a voltage shifter between SVID and the two GPIO pins if the voltage level of the two GPIO pins is not within 0.65V~4.3V. In certain embodiments, the GPIO pins are pulled high to 3.3V.

When the system is operating in the dGPU mode of operation, the switch for the iGPU and the switches for the SVID_data and SVID_clk signals are open. The embedded controller based on different power mode to set different output voltage for the voltage regulator via the two GPIO pins. The truth table of the two GPIO pins is shown in FIG. 5. The voltage regulator also includes a PVID detection circuit to support both SVID/PVID inputs. The voltage regulator can switch to a PVID input detection operation if the input of GPU mode is selected into dGPU mode. Alternately, the voltage regulator Vice versa, can switch to a SVID input detection operation if the input of GPU mode is selected into iGPU mode.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. An apparatus for regulating voltage to an integrated graphics controller and a discrete graphics controller, the apparatus comprising:
   a single power source; and,
   a graphics controller detection circuit coupled to the single power source, the graphics controller detection circuit receiving a graphics controller mode selection signal and providing a graphics power output signal based upon a state of the graphics controller mode selection signal, the graphics controller detection circuit comprising a parallel voltage identification (PVID) input and a serial voltage identification (SVID) input, the PVID input and the SVID input allowing a voltage regulator to switch between the PVID input and the SVID input, the voltage regulator further comprising a switch to avoid affecting processor communication on SVID pins while the information handling system is operating in a discrete graphics controller mode of operation.

2. The apparatus of claim 1, wherein: the PVID input comprises a 2-bit PVID input.

3. The apparatus of claim 1, wherein: the graphics controller detection circuit further comprises a PVID detection circuit, the PVID detection circuit comprising a voltage shifter for the PVID input.

4. The apparatus of claim 1 wherein:
   a processor and the integrated graphics controller use the same SVID pins.

5. An information handling system comprising:
   a single power source;
   an integrated graphics controller;
   a discrete graphics controller; and,
   a system for regulating voltage to the integrated graphics controller and the discrete graphics controller coupled to the single power source, the integrated graphics controller and the discrete graphics controller, the system comprising a graphics controller detection circuit coupled to the single power source, the graphics controller detection circuit receiving a graphics controller mode selection signal and providing a graphics power output signal based upon a state of the graphics controller mode selection signal, the graphics controller detection circuit comprising a parallel voltage identification (PVID) input and a serial voltage identification (SVID) input, the PVID input and the SVID input allowing a voltage regulator to switch between the PVID input and the SVID input, the voltage regulator further comprising a switch to avoid affecting processor communication on SVID pins while the information handling system is operating in a discrete graphics controller mode of operation.

6. The information handling system of claim 5, wherein: the PVID input comprises a 2-bit PVID input.

7. The information handling system of claim 5, wherein: the graphics controller detection circuit further comprises a PVID detection circuit, the PVID detection circuit comprising a voltage shifter for the PVID input.

8. The information handling system of claim 5 further comprising:
   a processor; and wherein,
   the processor and the integrated graphics controller use the same SVID pins.

* * * * *